Feb. 10, 1942.  R. HILTZ  2,272,944
OUTLET BOX COVER AND ADAPTER
Filed Jan. 31, 1939
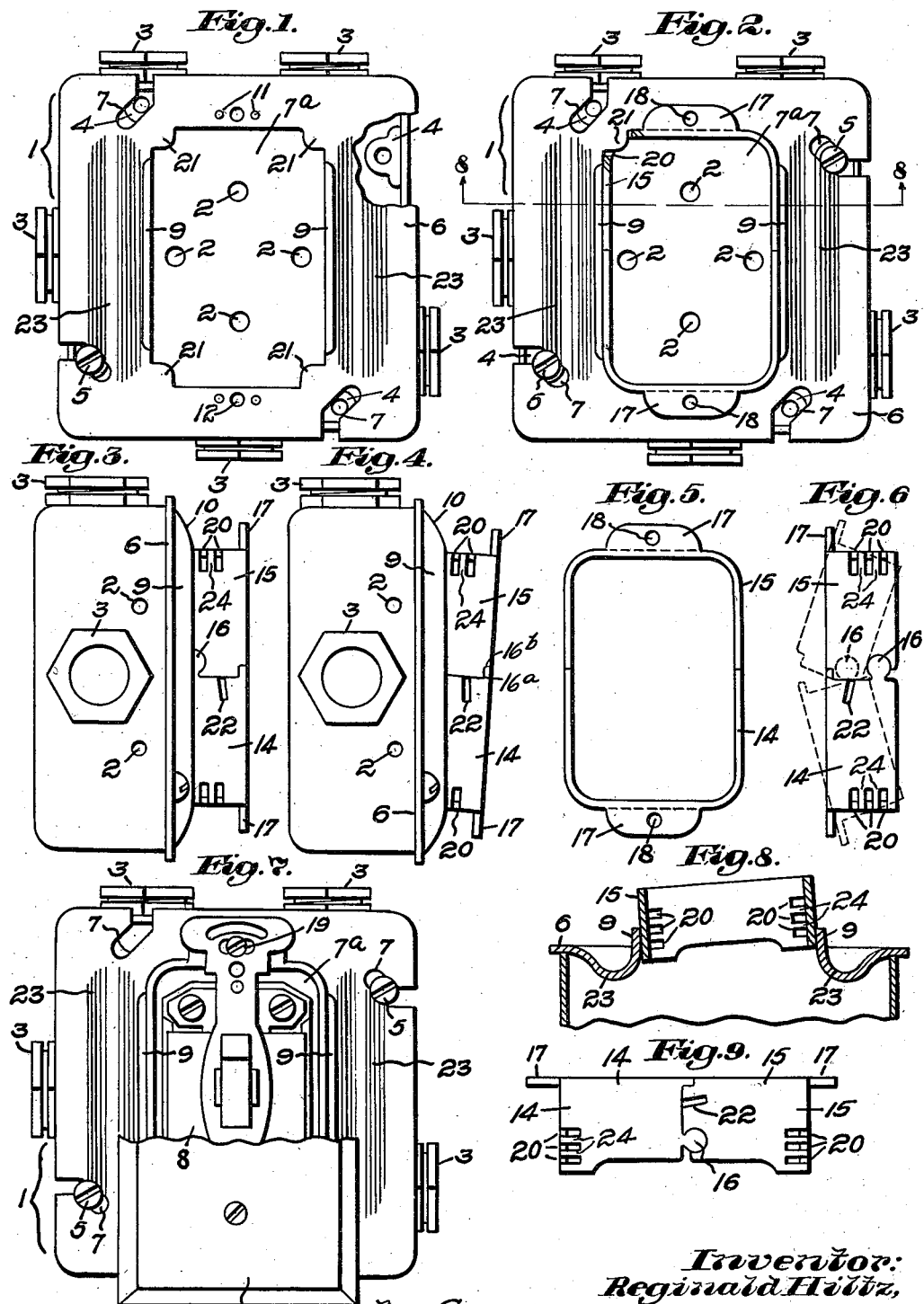
Inventor:
Reginald Hiltz,

Patented Feb. 10, 1942

2,272,944

UNITED STATES PATENT OFFICE 2,272,944

OUTLET BOX COVER AND ADAPTER

Reginald Hiltz, Brookline, Mass.

Application January 31, 1939, Serial No. 253,793

7 Claims. (Cl. 220—3.7)

This invention relates to electric switch and outlet boxes, and particularly the cover therefor, especially the type used in dwellings and business buildings for local branch circuits, and its aim is to provide an improved box of that type for convenient and more satisfactory installation.

In the drawing of the embodiment of my invention shown and illustrated herein:

Fig. 1 is a plan;

Fig. 2, a like view with my novel switch and outlet block adapter therein;

Fig. 3, a side elevation of the same;

Fig. 4, a similar view, with the adapter adjusted to register vertically with an uneven upright wall;

Fig. 5, a top view of the adapter;

Fig. 6, a side elevation thereof;

Fig. 7, a plan of the box with the adapter and switch in place therein, the switch plate partly broken away;

Fig. 8, a vertical cross section through the adapter on the line 8—8, Fig. 2, looking in the direction of the arrow, and showing the adapter adjusted to register horizontally with an uneven wall;

Fig. 9, a side elevation of an adapter of increased height.

As is well known, fire insurance companies, as well as municipal laws, except in small villages, require the use of switch and outlet boxes in all electric lighting installations, and a very large number of them are used in both fireproof, semi-fireproof and wooden frame construction buildings.

In practice, the cables and wires, or conduits, are run and the boxes are installed in as near the correct positions as possible, as soon as the wall supports of buildings are in position, so that when the wall has been plastered the covers may be applied to the boxes.

My box 1, itself, Fig. 1, preferably rectangular in shape, Figs. 1, 3, is substantially like the conventional box, of suitable fire-proof material as metal, with apertures 2 in its bottom, end and side walls, through which nails may be driven to secure the box in position. The box has cable and conduit locking connections 3 of desired number and size. The box is preferably of thin, light metal, and has, Figs. 1, 2, on the inner side of the walls, a plurality of lugs 4, threaded to receive locking screws 5, by which the cover 6, with its locking slots 7, is secured in position. For reasons presently stated, usually several covers with openings 7a at various heights above the cover proper are supplied, bringing the outer surface of the cover or adapter, if used, to a point where it will be flush with the finished plastered wall.

The cover, Fig. 7, has usually a rectangular opening 7a, to receive the switch or outlet block 8, the metal about the side edges of the opening, as at 9, Fig. 8, being preferably almost perpendicular, and about the end edges of the opening inclined as at 10, Figs. 3, 4, and provided with screw holes 11 to receive the outlet block screws, if the block is to be secured directly to the cover plate, as is normally intended. But if an adapter is used in a low position and if the screws locking it to the block should happen to be too long, as they often are, the screw end is received in the hole 12, Fig. 1. Sometimes, through error, the box is not installed exactly in the right place with respect to its distance from the outer finished wall surface, and more often, while it is installed correctly, something happens later in construction work to move it slightly.

Further, very often the coating of plaster is thicker than expected, so that the inner face of the wall plate, if applied to the box as installed, would not be flush with the wall. Then the plaster must be cut into, and a cover of proper height applied, so that the switch plate may be flush with the wall surface, but if the wall surface is painted or paper, this cannot be done without showing extreme damage about the plate, as extremely long screws are used to lock the block to the cover to cope with this condition, which does not comply with the underwriters' requirements. Or sometimes the plaster finish coat is thinner than it should be, and the plate, if applied, would project beyond the plaster. In such cases, as the box cannot be moved back in the wall, a lower cover is used.

In view of the result following the last situation, electricians have been accustomed to make a practice of intentionally setting the box a little too far back in the wall, if possible, as that situation is more easily remedied than the former one. To meet such an emergency as last described, block adapters so-called, for insertion in the opening in the box cover, have been made use of, adjusting them as may be necessary to suit each particular installation. These adapters have faults which my novel adapter overcomes.

The adapter shown in Figs. 5, 6, comprises a relatively thin metal frame in two sections, 14, 15, hinged together at their ends by a flat joint 16, of the ball and socket type, preferably midway of their ends, with a finger 16a on one section edge seatable in a seat 16b on the opposite section edge to reinforce the locking action of the member 16. Each section has a flange 17 at its end edge, which overlies the edge of the cover, and is tapped at 18, Fig. 2, to receive the thread of a screw 19, Fig. 7, to lock the block to the adapter. At each corner of the adapter, its side wall, Figs. 4, 6, is provided with adapter engaging means, as slots 20, one of each group of which receives, Fig. 1, an inwardly extended lip 21 on the inner edge of the cover opening.

To position the adapter in the cover, the adapter joints are broken at the hinges, see dotted lines Fig. 6, and the adapter ends positioned in the cover opening so that the four lips 21 therein are each inserted in a slot 20 the same distance from the bottom edge of the adapter, and equal to the distance that the adapter needs to be pushed forward in the wall, and again the adapter closed on its hinges. The adapter is thus quickly and easily positioned to place its upper edge and flange 17 flush with the wall surface, so that the block 8 will be properly positioned thereon to receive the switch plate. The slots 20 are, of course, so located that they will each raise the adapter, and of course the plate, when applied, a specified distance from the cover edge, as ½", ⅝" and ¾", or any other adjustment likely to be required and provided for.

If necessary, however, a still higher adapter, Fig. 9, may be used, to raise the wall plate still higher. One of each such adapters may be kept on hand for use, as needed. Two such adapters will take care of almost any situation where any adjustment is needed, but the lower adapter would be used about 80% of the time.

If, as is sometimes the case, the plaster surface is uneven, or if the support of the box has been knocked out of plumb, so that the wall plate will not lie flush and parallel with the wall surface, the adapter may be adjusted in the cover to meet the situation with one end farther forward than the other, as in Fig. 4, or with one side wall farther forward than the other, as in Fig. 8, and the switch plate A when applied, Fig. 7, thus made to lie parallel with the wall.

When the adapter is to be removed from the cover plate, one simply inserts the end of a small screw driver or knife blade in the slot 22 in the adapter, just above the hinge, Fig. 6, and with a slight downward pressure breaks the joint, and the adapter is very easily removed.

The bars 24 between two adjacent slots 20 are very thin, so that if satisfactory adjustment cannot be had by use of either of two adjoining slots, a slight blow of a small hammer or pair of pliers on the upper edge of the adapter will bend the bar sufficiently to adjust the adapter as desired.

To guard against chafing of any wires on the adapter lower edge, or edge of the opening in the plate, or loosening of the adapter in the cover, while the wire is being worked into the box and secured, the cover is depressed near the opening side edges to form a downwardly curved, wire protecting ridge 23 over which the wire may safely slide and rest, without danger of chafing thereon.

Heretofore, as stated, many boxes have been provided with several covers of different height, any one of which might be used as occasion required. In one case of which I am aware five covers are supplied for use with each box. This means great expense for the dealer and contractor, and annoyance for the workman. My adapter and cover is the simplest, most convenient, least expensive device, and the most satisfactory, that I know of.

My invention is not limited to the precise construction shown herein, but may be modified in many details, without departing from the spirit of the claims, and within the scope thereof.

I claim:

1. An outlet box cover with means for locking it to a box and having a block-receiving opening therein, a downwardly curved, wire-supporting and adapter-protecting ridge adjacent the opening edge to prevent any injury to the wires and loosening of the adapter when the wires are drawn through an outlet into the box; block adapter engaging means on the cover near the opening edge, a multi-section adapter having a shape substantially the shape of the opening in the cover and having its sections hingedly jointed midway its ends and having cooperating cover-engaging means permitting the adapter, when the joints are broken, to be positioned in said opening with selected cover-engaging means cooperating with adjacent adapter engaging means on the cover to position the adapter at selected height and angle in and to the cover, and locked therein when the adapter joints are closed.

2. A wall plate and block receiving adapter for an outlet box cover having a block and adapter receiving opening therein with adapter-engaging lips thereon, the adapter comprising two U-shaped plate and block-carrying members hingedly jointed midway their length at their free ends, and provided with lip-receiving slots in the adapter walls similarly spaced from the bottom edge of the adapter to independently receive the selected lips on the cover, the adapter insertable, with joints broken, within said cover opening and adjustably lockable therein by closing the joints.

3. An outlet box cover with means to lock it to a box and having a partly curved block-receiving opening therein, slot-receiving lips at the curves of the block-opening edge, a multi-part adapter hingedly jointed at approximately its mid-point, with lip-engaging slots thereon progressively spaced from the adapter top edge whereby the adapter, with its joints broken, may be inserted and positioned in the opening with selected slots thereon engaging the lips on the cover; and, with the joints closed, the adapter may be locked in the cover with the top edge of the adapter in selected position to lie flush with a plastered wall surface.

4. An outlet box cover having means to lock it to a box having cooperating cover locking means, the cover having a block-receiving opening therein, adapter engaging means adjacent its block opening edge, a two-part block and wall plate-receiving rectangular adapter hingedly jointed between its ends with locking elements at its corners progressively spaced from one adapter edge, to cooperate with the adapter engaging means on the cover whereby the adapter, with its joints broken, may be inserted and positioned with its locking elements longitudinally unevenly engaging the adapter engaging elements on the cover, and the joints closed.

5. A rectangular outlet box cover having a block and adapter receiving opening therein, adapter-engaging means at the opening edge, a multi-section rectangular block and plate-adapter of the shape of the cover opening with its sections movably pivoted together substantially equidistant from its outer ends, and with adapter locking means thereon spaced from the adapter edges whereby the adapter, with its joints broken, may be selectively positioned in the opening with the adapter locking means receiving the engaging means on the cover, and with its joints closed, the adapter locked in the cover, its sides unevenly positioned therein to lie flush with an unevenly plastered wall.

6. An outlet box cover having a block-receiving opening therein, adapter-engaging elements at the corners of the opening edge, a multi-section adapter with its parts hinged substantially at its midpoint, and a finger on one adapter section end seatable in a seat on the opposite adapter section end to reinforce said locking action, and with cover-cooperating elements progressively spaced from different points on the adapter edges; means on the adapter to receive a tool to break the joints of the adapter, the adapter, with its joints broken, insertable adjustably within the block-receiving opening and lockable therein with its joints closed and with cover engaging means thereon.

7. An outlet box with cover engaging means thereon and with outlet openings in the box walls to receive wires, a cover for the box with box engaging means thereon to cooperate with the cover engaging means on the box, said cover having an adapter and block receiving opening therein with adapter engaging means on the edge of the opening in the cover, an adapter comprising a plurality of parts and hinged substantially midway of the adapter ends and insertable in said opening, the adapter having cover engaging means for cooperating with the adapter engaging means on the cover opening edge, said cover having upright adapter supporting walls outlining said opening therein, the walls extending downwardly below the cover and blending into downwardly curved, longitudinal wire-contacting and adapter-position-protecting ridges on the lower surface of the cover and over which ridges wires may be drawn into the box through said outlets without breaking the wire insulation or dislocating the adapter from its position on the cover.

REGINALD HILTZ.